United States Patent Office 3,553,183
Patented Jan. 5, 1971

3,553,183
INTERPOLYMERIC ANTI-CLUMPING ADDITIVES
Nathan D. Field, Allentown, Pa., and Donald H. Lorenz,
Basking Ridge, N.J., assignors to GAF Corporation,
New York, N.Y., a corporation of Delaware
No Drawing. Filed Mar. 27, 1969, Ser. No. 811,256
Int. Cl. C08f 1/11, 15/02
U.S. Cl. 260—78.5                               11 Claims

ABSTRACT OF THE DISCLOSURE

Process for interpolymerization of maleic anhydride with alkyl vinyl ethers in the presence of an anti-clumping agent comprising copolymers of maleic anhydride with higher alkyl vinyl ethers in high solids content whereby the interpolymer is recovered as a free-flowing powder after evaporation of the solvent and in which the anti-clumping agent is compatible with the lower alkyl vinyl ether maleic anhydride copolymer at substantially pH 7 and above even at the boiling point of the solution.

BACKGROUND OF THE INVENTION

Field of the invention

This invention relates to a process for preparing interpolymers in powder form and more particularly relates to a process for preparing interpolymers of lower alkyl vinyl ethers and maleic anhydride which are free flowing after drying, wherein the polymerization is conducted at high solids content in the presence of a copolymer of maleic anhydride and a long-chain alkyl vinyl ether as an anti-clumping agent.

DESCRIPTION OF PRIOR ART

It is well known that lower alkyl vinyl ethers copolymerize with maleic anhydride in benzene solution in the presence of a free radical catalyst and in the absence of molecular oxygen at temperatures of from 40° to about 120° C. Vinyl methyl ether/maleic anhydride copolymer prepared by such procedure is soluble in ester and ketone solvents and dissolves in water, aqueous alkali and aqueous acid with hydrolysis of the anhydride moieties. Copolymers of maleic anhydride with alkyl vinyl ethers (where the alkyl group is of 3 or more carbon atoms, prepared by such procedure, give viscous solutions in ester and ketone solvents), do not dissolve to any great extent in water, but dissolve in aqueous alkali.

The preparation of lower alkyl vinyl ether/maleic anhydride copolymers by the foregoing procedure in slurries of greater than 20–25% solid content often yields solid products which are clumped on the stirrer, the baffle and the wall of the copolymerizing vessel and as a consequence are difficult to remove and to process.

To overcome the foregoing deficiencies, it has been proposed in the art to conduct the copolymerization in the presence of anti-clumping agents (granulating agents) so as to provide powdery products. The anti-clumping or granulating agents proposed include polystyrene, acrylate ester/styrene copolymer, poly(vinylcarboxylate) such as polyvinyl acetate, polyvinyl ethyl ether, polyvinyl isobutyl ether and polyvinyl methyl ether. These polymers (anti-clumping agents) are either insoluble in water or, in the case of poly(methylvinyl ether), only soluble below 30°–32° C. in water. Thus, when used in the polymerization of the lower alkyl vinyl ether/maleic anhydride copolymers, the anti-clumping agents must be removed if a clear aqueous solution of the product is desired at around room temperature or above. This requires that filtration and washing steps be introduced to remove the additive at the end of the polymerization.

The art describes the preparation of polymers other than vinyl ether/maleic anhydride copolymers which have a similar problem, i.e., a tendency to clump when prepared in slurries of high solids in organic solvent-diluents. It has been proposed to use water-insoluble, oil-soluble polymers as anti-clumping or granulating agents in these polymerization systems in which the resulting product (polymer) is insoluble in the medium in which the polymerization is performed. Such granulating agents include homopolymers or copolymers of $C_5$–$C_{18}$-alkyl methacrylates, vinyl ($C_6$–$C_{18}$) alkyl ethers, ($C_4$–$C_{18}$)-alkyl vinyl sulfides and vinyl ($C_6$–$C_{18}$) alkanolates with vinyl nitrogen-containing compounds.

SUMMARY OF THE INVENTION

Accordingly, one object of this invention is to provide a water-soluble anti-clumping agent for free-radical interpolymerization of maleic anhydride with alkyl vinyl ethers.

Another object is to provide a free-radical interpolymerization process for producing, in the presence of an anti-clumping agent, an interpolymer of maleic anhydride with alkyl vinyl ethers which is finely divided and free flowing after evaporation of a mutual solvent for the maleic anhydride, alkyl vinyl ethers, and anti-clumping agent.

An additional object is to provide an anti-clumping agent for free-radical interpolymerization of maleic anhydride with alkyl vinyl ethers in an organic diluent whereby the insoluble interpolymer which is produced after evaporating the organic media is capable of forming aqueous solutions of high clarity.

In fulfillment of these objectives, the present invention provides a process for the interpolymerization of maleic anhydride and alkyl vinyl ethers wherein the polymerization is carried out in the presence of an anti-clumping agent comprising copolymers of maleic anhydride and long-chain alkyl vinyl ethers.

DESCRIPTION OF THE INVENTION

The alkyl vinyl ethers which are polymerized with the maleic anhydride in the process of this invention may be generally described by the following formula:

$$CH_2=CH-OR$$

wherein R is an alkyl group of 1 to 6 carbon atoms (e.g. methyl ethyl, propyl, etc.) or a group of the formula $(-CH_2CH_2-O-)_n R_1$ wherein $n$ is an integer from 1 to 4 and $R_1$ is an alkyl group of 1 to 4 carbon atoms (e.g. methyl, ethyl, propyl or butyl). Thus the compounds to be interpolymerized with the maleic anhydride comprise alkyl vinyl ethers, alkoxyalkyl vinyl ethers and mixtures thereof.

The polymerization of these compounds is generally conducted in the presence of an organic diluent as the polymerization medium. The monomers employed are preferably partially-to-substantially soluble in the diluent and the resulting polymer is substantially insoluble. The reaction is also conducted in the presence of a free-radical type catalyst, either chemical or physical, to initiate and complete the reaction. The resulting solution generally has a solids content of about 30–50%.

Suitable organic diluents which may be employed in the process comprise particularly the aromatic hydrocarbons such as benzene, toluene or o-, m- or p-xylene as well as the halogenated aromatic hydrocarbons. However, it should be understood that any solvent can be employed so long as the solubility characteristics set forth above are satisfied, i.e., the solvent dissolves the monomers and anti-clumping agent, but not the formed polymer.

A suitable source of initiating free radicals may be selected from a large number of well known materials. The more common free-radical catalysts, which are useful in this process in the proportion of 0.01 percent to 2 percent based on total weight of monomers, are the acyl peroxides, such as acetyl peroxide, benzoyl peroxide, and lauroyl peroxide, and the alkyl peroxides, such as di-t-butyl peroxide, azobisisobutyronitrile, and the like. In addition, means such as light, X-ray, and gamma-ray radiation may be used to initiate the free-radical reaction by known methods. The choice of the catalyst depends on the temperature of polymerization which, in principle, may vary over a wide range, e.g., from 0° to 200° C. However, the preferred temperature range is from 40° to 120° C. for the above-defined catalysts.

In addition to the initiator and diluent and in accordance with this invention, the polymerization reaction also contains an anti-clumping agent in the proportion of about 0.5 percent to 10 percent, based on total weight of monomers present. This anti-clumping agent is preferably soluble in the organic medium and has water solubility at substantially neutral to alkaline pH's similar to that of the final polymerized product. The polymeric additives which have been found to have the necessary properties to function as anti-clumping agents according to this invention are copolymers of maleic anhydride with vinyl ethers of the formula:

$$CH_2=CH-OR_2$$

where $R_2$ is an alkyl group having from 10 to about 16 carbon atoms for imparting beneficial anti-clumping properties to polymerizations at high solids and preferably 12 to 16 carbon atoms for imparting clarity to aqueous substantially neutral to alkaline solutions of the resulting particulate products at temperatures up to the boiling point. These specific copolymers of this type which may be employed in the process of this invention include copolymers of maleic anhydride with tridecyl vinyl ether, myristyl vinyl ether, octadecyl vinyl ether, hexadecyl vinyl ether, decyl vinyl ether, dodecyl vinyl ether, and the like, as well as mixtures thereof.

These anti-clumping additive copolymers may be prepared by reacting the maleic anhydride and desired long chain alkyl vinyl ethers in an inert solvent in the presence of one of the free-radical catalysts mentioned above at a temperature ranging from about room temperature to 200° C. by known methods. Additionally, the copolymer may be prepared in situ and the resulting solution employed as the basic solution for the process of this invention.

These copolymers perform well in this invention as anti-clumping agents since they are both soluble in organic solvents and are soluble in water when partially neutralized with dilute alkali. The copolymer of maleic anhydride with octadecyl vinyl ether, however, caused the resulting interpolymer to be cloudy in aqueous solution although it performed well as an anti-clumping agent. Experimental studies, as illustrated in the examples which are set forth hereinafter, demonstrate that the invention depends upon compatibility relationships involving chain length and unsaturation.

By using the polymeric additives of this invention, it is possible to interpolymerize the vinyl ether monomer or mixed vinyl ether monomers with maleic anhydrides at very high solids contents in the organic liquid (i.e. up to 30–50%) and produce a slurry of particulate polymer particles which readily dries to a free-flowing powdered material. In controlled experiments without addition of anti-clumping agents, it was only possible to obtain particulate polymer slurries by conducting the polymerizations with extreme care and at low solids contents in the organic liquid.

In other controlled experiments in which homopolymers of short-chain alkyl vinyl ethers, which had been prepared as described on page 602 of "Vinyl and Related Polymers" by C. E. Schildknecht, were added as anti-clumping agents, excellent anti-clumping results were obtained, but the resultant powdered material produced a cloudy aqueous solution.

EXAMPLES

The following examples are provided to illustrate certain specific embodiments of the process of this invention. However, the invention is not to be considered as limited thereto.

Example I.—(Comparative example without additive)

A clean, dry 2-gallon autoclave, which was equipped with a turbine-type stirrer, condenser and pressure-equalized dropping funnel, was charged with 600 cc. of benzene and 1.7 grams of lauroyl peroxide. The temperature was raised to 70° C., and a solution, which had been made by dissolving 336 grams of isobutyl vinyl ether and 312 grams of maleic anhydride in 3,000 ml. of benzene, was slowly added over a two-hour period. The solids content within the autoclave was calculated to be 18%.

One hour after addition was complete, a test for maleic anhydride was positive, but the reactor was cooled to room temperature. When the reactor was opened, a solid clump of material was found on the stirrer and shaft and on the bottom of the reactor. A sample of the benzene was perfectly clear, indicating that a slurry was not obtained. The solid clump of polymer had to be chopped off the stirrer and bottom of the reactor in order to remove it.

Example II.—(Prior art example, according to Belgian Patent No. 649,881)

A clean, dry, 2-gallon autoclave, which was equipped with a turbine-type stirrer and baffle, condenser, and pressure-equalized dropping funnel, was charged with a solution made with 700 grams of maleic anhydride in 2,400 ml. of benzene and with 56 grams of a 50% solution of polyvinyl methyl ether in toluene. This mixture was heated to 75° C. when 3.6 grams of lauroyl peroxide in 70 ml. of benzene were added. Addition of 735 grams of isobutyl vinyl ether was then begun and continued at a uniform rate over a 2-hour period. The solids content within the autoclave was calculated to be 37%.

One-half hour after addition of the vinyl ether had been completed, a test for maleic anhydride showed that all of it had reacted. The reactor was cooled to room temperature and opened. No clumped material was observed. The slurry was removed, and the benzene was distilled therefrom under reduced pressure without filtration. The fine white solid was further dried overnight to constant weight in a vacuum oven.

A solution was prepared by adding 5 grams of the product to 70 ml. of water with adjustment of pH to 7 with dilute potassium hydroxide and final adjustment to 100 ml. by adding water. Heating the solution to a temperature above 32° C. resulted in a cloudy solution because the cloud point of the poly (methyl vinyl ether) had been reached.

This was an example of excellent anti-clumping activity with short-chain poly (alkyl vinyl ethers). The advantages of being able to conduct the polymerization at high solids content and without clumping behaviour were obtained, but the particulate products failed to give clear aqueous solutions up to boiling temperatures.

In contrast, copolymers of maleic anhydride with long-chain alkyl vinyl ethers acted as excellent anti-clumping agents and possessed cloud points above 100° C., as demonstrated hereinafter, in neutral or alkaline aqueous solutions.

Example III

A 20% solution of the copolymer of tridecyl vinyl ether and maleic anhydride was prepared by dissolving 28 grams of this copolymer in 112 cc. of benzene. This solution was added to 800 cc. of benzene and charged into a clean, dry, 2-gallon autoclave. The autoclave was equipped with a 4-blade turbine stirrer with baffle, condenser, and pressure-equalized dropping funnel. Air was purged from the reactor by pulling a vacuum and releasing with nitrogen three times.

While maintaining a positive head of nitrogen, the temperature was raised to 75° C., and 3.6 grams of lauroyl peroxide in 100 cc. of benzene were added. At that point, 50 cc. of a solution made by dissolving 700 grams of maleic anhydride and 735 grams of isobutyl vinyl ether in 2800 cc. of benzene were added to the reactor. After waiting 15 minutes, addition of the remainder of the solution was controlled so that it was added over a 2-hour period. One-half hour after addition was complete, the triphenylphosphine paper test indicated the absence of unreacted maleic anhydride. The solids contents within the autoclave was calculated to be 28%.

After the reactor had cooled to room temperature, it was opened. No clumped solid could be seen, but a slurry of the product in benzene was clearly observable. The slurry was removed from the reactor and, without filtering benzene was removed from the slurry under vacuum at 80° C., on a rotary evaporator, producing a white powdery solid. This solid was further dried by placing it in a vacuum oven overnight. A sample removed had a relative viscosity of 1% in acetone at 30° C. of 1.53. The total weight of the dry interpolymer produced by this reaction was 1,350 grams.

A solution was prepared by adding 5 grams of this interpolymer product to 80 ml. of water. The pH of the solution was adjusted to 8 with 4% aqueous potassium hydroxide, with stirring and heating. As the polymer dissolved, the pH dropped, and more base was added until final dissolution and adjustment of pH to 7. The volume was then brought to 100 cc. by adding more water. This solution was clear and remained clear even on heating to the boiling point.

Example IV

A clean, dry resin pot of 500-ml. capacity, which was equipped with stirrer, condenser, thermometer, and pressure-equalized dropping funnel, was charged with a copolymer solution made by dissolving 0.9 gram of a maleic-anhydride copolymer of a cetyl vinyl ether mixture, having ⅓ of its weight as octadecyl vinyl ether, and maleic anhydride in 42 ml. of benzene. As the temperature was raised to reach 75° C., 0.18 gram of lauroyl peroxide was added. At 70° C., 20 ml. of a solution, made by dissolving 44.5 grams of maleic anhydride and 48.0 grams of isobutyl vinyl ether in 150 ml. of benzene, were added. Within two minutes, the benzene began to get cloudy. After eight minutes, addition of the remainder of the solution was begun and continued so that it was added over a period of 1½ hours. The solids content within the resin pot was calculated to be 33%.

Within one hour after addition of all the solution, the test for maleic anhydride showed that none remained. After cooling the pot and its contents to room temperature, the slurry was removed and placed in a rotary evaporator. Benzene was evaporated from the slurry under reduced pressure. The white solid was then placed in a vacuum oven and dried to a constant weight of 88.0 grams. It had a relative viscosity of 1.49 as a 1% solution in acetone.

Water solutions of the product were prepared as described in the previous example and were almost clear but had a very slight opalescence because of the incompatibility of the $C_{18}$ portion of the cetyl vinyl ether mixture which had been copolymerized with maleic anhydride.

EXAMPLE V

A clean, dry, 500-ml. resin pot, which was equipped with stirrer, condenser, thermometer and pressure-equalized dropping funnel, was charged with a solution made by dissolving 5.0 grams of a copolymer of maleic anhydride and octadecyl vinyl ether in 100 ml. of benzene. When the temperature reached 70° C., additions were made of 0.24 grams of lauroyl peroxide and of 12 ml. of a solution made by dissolving 44.5 grams of maleic anhydride and 48.0 grams of isobutyl vinyl ether in 150 ml. of benzene. After waiting 12 minutes, the remainder of the solution was added over a period of 1½ hours. After waiting 15 minutes longer, the test for maleic anhydride showed that all had reacted. The solids content within the resin pot was calculated to be 28%. The resin pot and contents were cooled to room temperature, and the slurry was removed.

Benzene was tripped from the slurry on a rotary evaporator under vacuum, leaving a fine white powder. This powder was transferred to a vacuum oven and dried to constant weight. The relative viscosity of the product in acetone as a 1% solution was 1.43.

A solution was prepared by dissolving 5 grams of this product into 80 ml. of water and adjusting the pH to 7 with alkali while heating and stirring. This solution was cloudy, hence an alkyl vinyl ether of somewhat smaller chain length than $C_{18}$ is preferred for use as an anti-clumping agent of this invention.

In order to define the importance of chain length for the monomer which is incorporated in the anti-clumping copolymers, another solution was prepared by mixing individual solutions at a pH of 7 of an interpolymer of maleic anhydride and isobutyl vinyl ether, which had been made without use of the anti-clumping agent of this invention, and of the same copolymer of octadecyl vinyl ether with maleic anhydride. The mixture was also cloudy, indicating incompatibility of the two solutions.

EXAMPLE VI

A clean dry, 500-ml. resin pot, which was equipped with stirrer, condenser, thermometer, and pressure-equalized dropping funnel, was charged with a solution made by dissolving 0.9 gram of a copolymer of hexadecyl vinyl ether with maleic anhydride in 42 ml. of benzene. As the temperature was raised to reach 75° C., 0.18 gram of lauroyl peroxide were added. At 70° C., 20 ml. of a solution made by dissolving 44.5 grams of maleic anhydride and 48.0 grams of isobutyl vinyl ether in 150 ml. of benzene were added. After waiting 15 minutes, the remainder of the solution was added over a period of 1½ hours. The solids content within the resin pot was calculated to be 33%.

Within one hour after addition was completed, the test for maleic anhydride showed that none remained. After cooling the pot and its contents to room temperature, the slurry was removed and placed in a rotary evaporator. Benzene was removed under reduced pressure. The white solid was then placed in a vacuum oven and dried to a constant weight of 88.0 grams. The product had a relative viscosity of 1.5 as a 1% solution in acetone.

Water solutions of the product were prepared as described in the preceding examples. At pH 7, they were completely clear, even at the boiling point of the solution.

EXAMPLE VII

A clean, dry, 500-ml. resin pot, which was equipped with stirrer, condenser, thermometer and pressure-equalized dropping funnel, was charged with a solution made by dissolving 4.0 grams of a copolymer of decyl vinyl ether and maleic anhydride in 100 ml. of benzene. As the temperature was raised to reach 75° C., 0.12 gram of lauroyl peroxide and 20 ml. of a solution, made by dissolving 44.5 grams of maleic anhydride and 48 grams of isobutyl vinyl ether in 200 ml. of benzene, were added. After waiting 5 minutes, the remainder of the solution was added over a period of 1½ hours. The solids content within the resin pot was calculated to be 24%.

Within one hour after addition was completed, the test for maleic anhydride was negative. After cooling to room temperature, the slurry was removed, and the benzene was evaporated under reduced pressure. The white solid was then placed in a vacuum oven and dried to a constant weight of 91.7 grams; it had a relative viscosity of 1.39 as a 1% solution in acetone.

The water solutions of the product, which were prepared as described in the preceding examples, were completely clear, even at the boiling point of the solution.

EXAMPLE VIII

A clean, dry, 500-ml. resin pot, which was equipped with stirrer, condenser, thermometer, and pressure-equalized dropping funnel, was charged with a solution made by dissolving 2.0 grams of a copolymer of maleic anhydride and dodecyl vinyl ether in 100 ml. of benzene. As a free-radical catalyst, 0.15 gram of lauroyl peroxide were added. The solution was heated to 75° C., and 25 ml. of a solution, made by dissolving 44.5 grams of maleic anhydride and 48.0 grams of isobutyl vinyl ether in 200 ml. of benzene, were added. After waiting 5 minutes, addition of the remainder of the solution was begun and continued over a period of 1½ hours. Within 15 minutes after adding all of the solution, the test for maleic anhydride showed that it had completely reacted. The solids content within the resin pot was calculated to be 24%.

After cooling the resin pot and contents to room temperature, the slurry was removed. The benzene was evaporated under reduced pressure on a rotary evaporator. The white powdery solid was then placed in a vacuum oven and dried to a constant weight of 86.0 grams. It had a relative viscosity as a 1% solution in acetone of 1.48.

An aqueous solution of the product was prepared as in Example III and was completely clear even at the boiling point of the solution.

EXAMPLE IX

A clean, dry, 500-ml. resin pot, which was equipped with stirrer, condenser, thermometer, and pressure-equalized dropping funnel, was charged with a solution of 4.0 grams of a copolymer of maleic anhydride and octyl vinyl ether in 100 ml. of benzene. As the temperature was raised toward 75° C., 0.12 gram of lauroyl peroxide and 20 ml. of a solution, made by dissolving 44.5 grams of maleic anhydride and 48 grams of isobutyl vinyl ether in 200 ml. of benzene, were added. After waiting 5 minutes, the remainder of the solution was added at a rate requiring 1½ hours for complete addition. One hour after addition was started, it was observed that the polymer being formed began to agglomerate into a sticky, coherent mass. When the polymer began to clump on the stirrer and walls of the flask, the reaction was terminated by cooling.

This example shows that a $C_8$ VE/MA copolymer does not effectively act as an anticlumping agent.

As shown in the preceding examples, this invention uses principles which are known in general in the prior art; however, this invention is directed toward free-radical polymerizations and solves a troublesome practical problem. The process and compositions of this invention prevent clumping when the interpolymer precipitates, immediately following localized interpolymerization, because of insolubility in the organic solvent.

As a general advance in the polymerization art, the instant process also solves the clarity problem which is common to many types of polymerization methods and which is set forth in lines 104–106 on page 3, of British Patent No. 1,008,001. Even though the anti-clumping agents of this invention are used at normal levels and are retained in the resultant interpolymers, aqueous solutions can be made therewith which are completely clear at pH 7 and above as set forth in the preceding examples, because of the instant discovery of compatibility relationships involving chain length and unsaturation.

As is apparent, many variations on this invention can be made without departing from the principles thereof. The scope and definition of these principles are set forth in the appended claims which should be considered to be the sole boundaries of this invention.

What is claimed is:

1. A process for free-radical interpolymerization without clumping of the interpolymer which is produced, comprising:
    (A) dissolving maleic anhydride as a first monomer; a lower alkyl vinyl ether as a second monomer, having the formula: $CH_2=CH-OR$, wherein R is an alkyl group of from 1 to 6 carbon atoms or a group having the formula: $(-CH_2CH_2-O-)_nR_1$, wherein $n$ is an integer from 1 to 4 and $R_1$ is an alkyl group of from 1 to 4 carbon atoms, or a mixture thereof; and an anti-clumping agent in an organic medium acting as a mutual solvent for the monomers and anti-clumping agents which is not a solvent for said interpolymer, said anti-clumping agent being an alkyl vinyl ether copolymer of maleic anhydride and alkyl vinyl ethers having the formula:

$$CH_2=CH-OR_2$$

in which $R_2$ is an alkyl group of 10 to 16 carbon atoms;
    (B) in the presence of a free-radical catalyst, reacting said maleic anhydride and said lower alkyl vinyl ether; and
    (C) recovering said interpolymer by removing said organic medium.

2. The process of claim 1 wherein said anti-clumping agent is present in proportions of about 0.5 to 10% by weight of the monomers in solution.

3. The process of claim 2 wherein said $R_2$ is an alkyl group of 12 to 16 carbon atoms.

4. The process of claim 3 wherein said interpolymer which is produced forms a 5% aqueous solution at substantially pH 7 or above which is clear at its boiling point.

5. The process of claim 1 wherein said interpolymerization is conducted at 40°–120° C.

6. The process of claim 5 wherein said free-radical catalyst is dissolved in said organic medium and is selected from the class consisting of benzoyl peroxide, azobisisobutyronitrile, lauroyl peroxide, and di-t-butyl peroxide.

7. The process of claim 6 wherein said interpolymer is a free-flowing powder after evaporation of said organic medium.

8. The process of claim 7 wherein said organic medium is selected from the class consisting of benzene, toluene, ortho-xylene, meta-xylene, and para-xylene.

9. Interpolymers of lower alkyl vinyl ethers and maleic anhydride which are free flowing after drying and capable of forming clear aqueous solutions substantially at pH 7 or above and up to the boiling points of said solutions, prepared in the presence of a free radical catalyst and additionally containing as an anti-clumping agent for said interpolymer, a copolymer of maleic anhydride and alkyl vinyl ethers having the formula:

$$CH_2=CH-OR_2$$

in which $R_2$ is an alkyl group of 10 to 16 carbon atoms.

10. The anti-clumping agents of claim 9 wherein said $R_2$ is an alkyl group of 12 to 16 carbon atoms.

11. The anti-clumping agents of claim 10 wherein said alkyl vinyl ether is selected from the class consisting of tridecyl vinyl ether, myristyl vinyl ether, hexadecyl vinyl ether, dodecyl vinyl ether, and decyl vinyl ether.

References Cited

FOREIGN PATENTS 649,881  12/1964  Belgium _____ 260—78.5

JOSEPH L. SCHOFER, Primary Examiner

J. KIGHT III, Assistant Examiner

U.S. Cl. X.R.

260—34.2, 874